United States Patent
Philp et al.

(10) Patent No.: US 11,843,254 B2
(45) Date of Patent: Dec. 12, 2023

(54) GAPS BETWEEN TRANSMITTERS AND RECEIVERS IN WIRELESS POWER SYSTEMS AND RELATED SYSTEMS, METHODS, AND DEVICES

(71) Applicant: Skullcandy, Inc., Park City, UT (US)

(72) Inventors: Andrew Philp, Salt Lake City, UT (US); Parker Coons, Salt Lake City, UT (US)

(73) Assignee: Skullcandy, Inc, Park City, UT (US)

( * ) Notice: Subject to any disclaimer, the term of this patent is extended or adjusted under 35 U.S.C. 154(b) by 114 days.

(21) Appl. No.: 17/303,071

(22) Filed: May 19, 2021

(65) Prior Publication Data

US 2022/0376549 A1    Nov. 24, 2022

(51) Int. Cl.
| | |
|---|---|
| *H01M 10/44* | (2006.01) |
| *H01M 10/46* | (2006.01) |
| *H02J 50/00* | (2016.01) |
| *H02J 50/10* | (2016.01) |
| *H02J 7/00* | (2006.01) |
| *H02J 7/02* | (2016.01) |

(52) U.S. Cl.
CPC .......... *H02J 50/005* (2020.01); *H02J 7/0044* (2013.01); *H02J 7/02* (2013.01); *H02J 50/10* (2016.02)

(58) Field of Classification Search
CPC ...... H02J 7/0044; H02J 7/0042; H02J 7/0068; H02J 7/02; H02J 50/10; H02J 50/005; H04R 1/1025

USPC ................... 320/107, 108, 114, 115
See application file for complete search history.

(56) References Cited

U.S. PATENT DOCUMENTS

| | | |
|---|---|---|
| 2015/0280483 A1 | 10/2015 | Golko et al. |
| 2017/0094399 A1 | 3/2017 | Chandramohan et al. |
| 2020/0221843 A1 | 7/2020 | Brzezinski et al. |

OTHER PUBLICATIONS

European Extended Search Report and Opinion for European Application No. 22174172.1, dated Dec. 6, 2022, 12 pages.

*Primary Examiner* — Edward Tso
(74) *Attorney, Agent, or Firm* — TraskBritt (57) ABSTRACT

Gaps between transmitters and receivers in wireless power systems and related systems, methods, and devices are disclosed. A housing includes an internal surface configured to face a receive power coil and an external surface configured to face a wireless power transmitter. The external surface is shaped to define one or more gaps between the external surface and a surface of the wireless power transmitter responsive to placement of the external surface into engagement with the surface of the wireless power transmitter. An electronic device includes a receive power coil and a barrier including an internal surface facing the receive power coil and an external surface configured to face a transmit power coil. The external surface defines a gap between the external surface and a surface of the wireless power transmitter responsive to placement of the external surface in engagement with the surface of the wireless power transmitter.

20 Claims, 5 Drawing Sheets

GAPS BETWEEN TRANSMITTERS AND RECEIVERS IN WIRELESS POWER SYSTEMS AND RELATED SYSTEMS, METHODS, AND DEVICES

TECHNICAL FIELD

This disclosure relates generally to gaps between transmitters and receivers in wireless power systems, and more specifically to gaps between wireless power transmitters and charging cases for truly wireless stereo (TWS) headphones.

BACKGROUND

The size of electronic devices has generally trended smaller with the passage of time as improved designs enabled manufacturing of electronic devices that occupy smaller volumes. For example, improvements in battery (e.g., rechargeable battery) technology has, over time, increased battery efficiency, enabling storage and provision of equal or greater power by smaller batteries as compared to larger, less efficient batteries.

Despite recent advancements in battery technology, batteries often occupy a relatively large portion of space available in mobile electronic devices, many of which rely on battery power to enable their mobility. Also, batteries are often the limiting factor in terms of mobile devices' lifespans. For example, battery end of life (EoL) for a non-removable rechargeable battery often marks the end of the useful life of the device that the battery powers.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, the term "irregular," when used to specify a geometry of a surface (e.g., a surface of a wall of a housing) refers to a deviation of the surface from being planar (e.g., flat). As a result, an irregular surface, responsive to physical engagement with a planar surface, at least partially defines one or more gaps between the planar surface and the irregular surface. Stated another way, responsive to physical engagement with a planar surface, only a first portion of an irregular surface is in physical contact with the planar surface and a second portion of the irregular surface is not in contact with the planar surface. A concave surface is one of many possible examples of an irregular surface.

Truly wireless stereo (TWS) headphones are one example of mobile devices that rely on rechargeable batteries. For example, both the headphones themselves and a charging case used to charge the headphones generally include batteries to provide mobile power.

Recent advances in battery technology have enabled reduction in size of TWS headphones and charging cases for TWS headphones as compared to older TWS headphones and charging cases for older TWS headphones lacking the most recent battery advancements. Although the reduced size of charging cases for more recent TWS headphones has its advantages, the reduced size may also result in heat dissipation issues because a smaller device presents a smaller volume within which heat may spread out and dissipate. Since heat is generated during charging of batteries, heat dissipation for TWS headphone cases is a nontrivial engineering challenge.

A further technological advancement relevant to TWS headphone cases is wireless charging technology. Wireless charging is a popular technology because it reduces or eliminates the need for cumbersome charging cables, which have a tendency to clutter a space and are often a point of malfunction (especially at their connectors). Wireless charging, however, may exacerbate the heat dissipation issues faced by mobile devices, which are already difficult due to the ever shrinking size of mobile electronics. For example, a TWS headphone charging case may conduct heat away from a charging pad when placed thereon. Since conduction of electrical charge through a coil, such as a transmit power coil of a wireless power transmitter, generates heat, a wireless power transmitter may generate a relatively large amount of heat. A mobile electronic device such as a TWS headphone charging case in contact with a wireless power transmitter may conduct a relatively large amount of heat from the charging pad to the TWS headphone charging case. Moreover, the reduced size of newer TWS headphone charging cases, relative to older generation TWS headphone charging cases, may result in batteries being positioned closer to heat-generating transmit power coils than in older, larger TWS headphone charging cases.

Battery life, which is often the limiting factor in device usable life, is adversely affected by heat. Accordingly, wireless charging may expose the battery of a mobile device to heat, which may reduce the usable life of the mobile device. Mobile devices may be equipped with battery temperature sensing circuitry to halt wireless charging when temperatures exceed predetermined parameters, but halting wireless charging may result in longer charge times.

Conventional wirelessly charged accessories typically have flat surfaces for conformally engaging a flat surface of a charging pad of a wireless power transmitter to maximize charging efficiency between the wireless power transmitter and the wireless power receiver. Conformal engagement between the charging pad and the wirelessly charged accessory may, however, tend to maximize a surface area of the wirelessly charged accessory that is in contact with the charging pad, which may result in high heat conductivity from the charging pad to the wirelessly charged accessory.

Disclosed herein are electronic devices that are shaped to allow for gaps between electronic devices and wireless power transmitters during charging. A gap may reduce the total surface area of an electronic device that is in contact with the wireless power transmitter, which may reduce the amount of heat that is conducted from the wireless power transmitter to the electronic device. Also, a gap may allow air to circulate through the gap, which may facilitate dissipation of heat (e.g., through convection of the air, which may stimulate air circulation). Since electronic devices disclosed herein reduce the amount of heat transfer from the wireless power transmitter to the electronic device, electronic devices disclosed herein may benefit from faster charge times, longer battery lives, or both, as compared to electronic devices that are not shaped to allow for gaps.

A shape of a housing of a mobile electronic device that allows for one or more gaps between the mobile electronic device and a wireless power transmitter may function as a form of thermal management. This thermal management approach may be used instead of or in addition to other thermal management approaches such as insulation, heat sinks, fans, liquid cooling, and vapor chambers. The use of one or more gaps between the mobile electronic device and the wireless power transmitter may result in lower internal temperatures during wireless charging than a mobile electronic device designed for conformal engagement with the wireless power transmitter (e.g., having a flat-bottomed housing that is conformal to a flat wireless charging pad). As a result, mobile electronic devices according to various embodiments disclosed herein may achieve similar internal temperatures to flat-bottomed mobile electronic devices that employ one or more additional other thermal management solutions (e.g., insulation) while reducing or avoiding the costs and complexities that are inherent to those other thermal management solutions.

Two factors influencing charging efficiency include (1) a distance between a transmit power coil of the wireless power transmitter and a receive power coil of the electronic device, and (2) axial alignment between the transmit power coil and the receive power coil. A gap between a wireless power transmitter and a wireless power receiver may increase the distance between the transmit power coil and the receive power coil, reducing the charging efficiency as compared to conformal coils. The reduction of efficiency may, however, be relatively small (e.g., negligible).

In some embodiments a housing for an electronic device includes an internal surface configured to face a receive power coil and an external surface configured to face a wireless power transmitter. The external surface and the internal surface are on opposing sides of a housing wall. The external surface is shaped to define one or more gaps between the external surface and a surface of the wireless power transmitter responsive to placement of the external surface into engagement with the surface of the wireless power transmitter.

In some embodiments an electronic device includes a receive power coil and a barrier. The receive power coil is configured to receive wireless power from a transmit power coil of a wireless power transmitter. The barrier includes an internal surface facing the receive power coil and an external surface configured to face the transmit power coil. The external surface defines one or more gaps between the external surface and a surface of the wireless power transmitter responsive to placement of the external surface in engagement with the surface of the wireless power transmitter.

In some embodiments a method of operating an electronic device includes engaging a portion of an external surface of a housing of the electronic device with a surface of a wireless power transmitter. The method also includes forming one or more gaps between the external surface of the housing and the surface of the wireless power transmitter based, at least in part, on an irregular geometry of the external surface of the housing. The method further includes receiving, at a receive power coil of the electronic device, wireless power from a power transmit coil of the wireless power transmitter.

Figure 1:
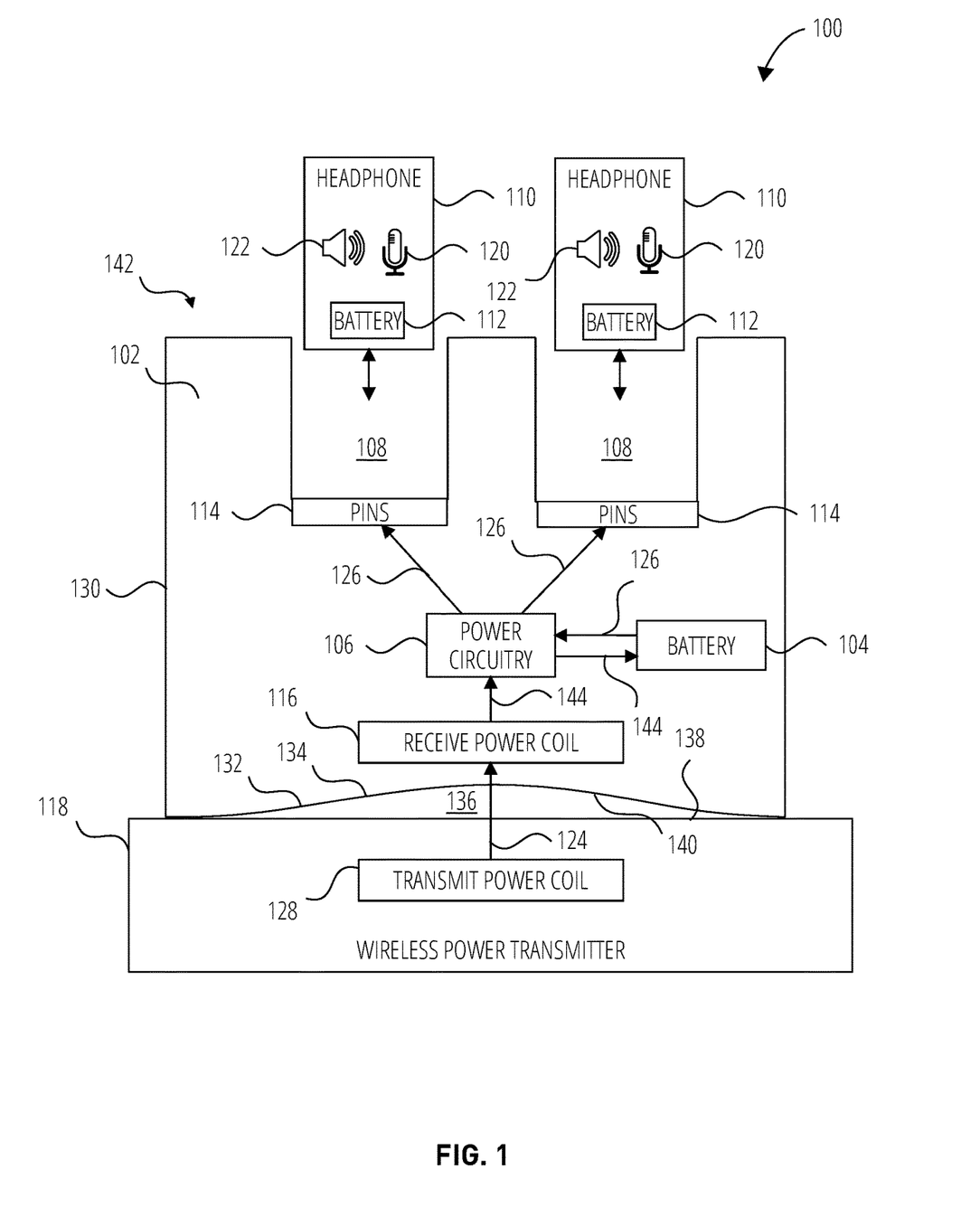
FIG. 1 is a block diagram of a wireless power system, according to some embodiments.

FIG. 1 is a block diagram of a wireless power system 100, according to some embodiments. The wireless power system 100 includes an electronic device 142 and a wireless power transmitter 118. The electronic device 142 includes a receive power coil 116 configured to receive wireless power 124 from a transmit power coil 128 of the wireless power transmitter 118 (e.g., via inductive coupling). The electronic device 142 also includes a barrier 132 between the receive power coil 116 and the wireless power transmitter 118. The barrier 132 may be substantially transparent to electromagnetic radiation of the wireless power 124 from the transmit power coil 128.

The electronic device 142 further includes a housing 130 for the electronic device 142. The housing 130 encloses the receive power coil 116, and the barrier 132 may be a wall of the housing 130. The housing 130 (e.g., the barrier 132) includes an internal surface 134 configured to face the receive power coil 116 and an external surface 140 configured to face a transmit power coil 128 of the wireless power transmitter 118. The external surface 140 and the internal surface 134 are on opposing sides of a housing wall (e.g., the barrier 132). The external surface 140 is shaped to define one or more gaps (e.g., gap 136) between the external surface 140 and a surface 138 of the wireless power transmitter 118 responsive to placement of the external surface 140 into engagement with the surface 138 of the wireless power transmitter 118.

The external surface 140 may have any of various different shapes, according to embodiments of the disclosure. By way of non-limiting example, the external surface 140 may be at least substantially concave, as illustrated in FIG. 1. By contrast, the surface 138 of the wireless power transmitter 118 may be planar. As a result, the external surface 140 of the electronic device 142 may be irregular, resulting in one or more gaps (e.g., the gap 136) between the external surface 140 and the surface 138. Also by way of non-limiting example, the one or more gaps (e.g., the gap 136) may be shaped to enable air to pass between the external surface 140 of the housing 130 and the surface 138 of the wireless power transmitter 118 responsive to placement of the external surface 140 into engagement with the surface 138 of the wireless power transmitter 118.

The internal surface 134 also may have any of various different shapes, according to embodiments of the disclosure. By way of non-limiting example, the internal surface 134 may be convex from a perspective of within the housing 130, as illustrated in FIG. 1. In some such embodiments a convex internal surface 134 may be configured to support a convex receive power coil 116 (e.g., convex from a perspective of within the housing 130). As another non-limiting example, the internal surface 134 may be planar (not shown) to support a planar receive power coil 116. In some embodiments the receive power coil 116 may be conformal to the internal surface 134 of the barrier 132 and may therefore have substantially the same shape as a portion of the internal surface 134.

The electronic device 142 may be any of various different electronic devices. By way of non-limiting example, the electronic device 142 may be a TWS headphone system including a TWS headphone charging case 102 and headphones 110. In such embodiments the housing 130 is a housing for the TWS headphone charging case 102. The TWS headphone charging case 102 may include a battery 104 configured to provide battery power 126. In some embodiments a portion of the battery 104 may extend past the receive power coil 116 proximate to the internal surface 134. The TWS headphone charging case 102 may also include power circuitry 106 configured to control charging of the battery 104 and deliver at least a portion of the battery power 126 to the headphones 110 (e.g., via charging pins 114 in headphone receptacles 108 configured to receive the headphones 110). The power circuitry 106 may charge headphone batteries 112 of the headphone 110 using the battery power 126. The headphone batteries 112 are configured to power speakers 122, and in some embodiments microphones 120, of the headphones 110, and other circuitry of the headphones 110. The power circuitry 106 may charge the battery 104 of the TWS headphone charging case 102 using power 144 from the receive power coil 116. As other non-limiting examples, the electronic device 142 may be any of a smart phone device, a tablet computer, a wireless headphone device (e.g., on-ear, around-ear, or in-ear headphones), a video game controller, a portable tool or instrument, a watch (e.g., a smart watch), electronic glasses, a speaker assembly, or other mobile devices, which may include the power circuitry 106 and battery 104 discussed for the TWS headphone charging case 102.

Figure 2:
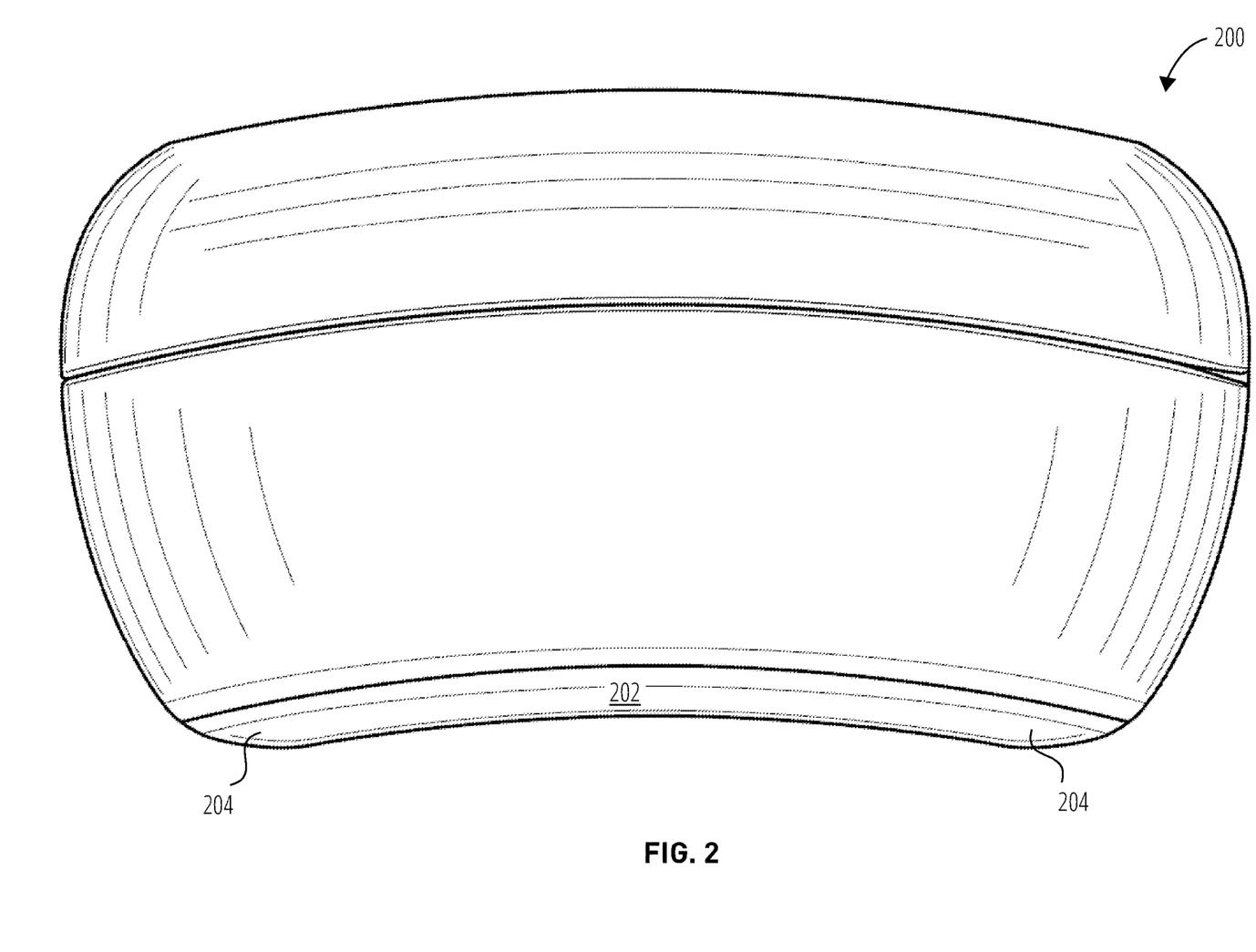
FIG. 2 is a front view of a TWS headphone charging case, which is an example of a TWS headphone charging case of the wireless power system of FIG. 1.

FIG. 2 is a front view of a TWS headphone charging case 200, which is an example of a TWS headphone charging case 102 of FIG. 1. The TWS headphone charging case 200 includes an external surface 202 of a bottom thereof, which is configured to engage a surface of a wireless power transmitter (e.g., the surface 138 of the wireless power transmitter 118 of FIG. 1). In the example of FIG. 2 the external surface 202 is concave to define a gap (e.g., the gap 136 of FIG. 1) between the external surface 202 and a surface of a wireless power transmitter (e.g., the wireless power transmitter 118 of FIG. 1) responsive to placement of the external surface 202 in engagement with the surface of the wireless power transmitter (e.g., placement of the TWS headphone charging case 200 on a charging pad of a wireless power transmitter).

Since substantially the entire external surface 202 of the TWS headphone charging case 200 is concave, air may flow through the gap when the external surface 202 is in engagement with the wireless power transmitter since airflow and convection, by extension, would be enabled through the gap due to the concave shape of the external surface 202. Also, only side surfaces 204 of the external surface 202 would be in physical contact with the surface of the wireless power transmitter, thus reducing heat conduction from the wireless power transmitter compared to a case where a conformal (flat) external surface is used.

In addition to the thermal advantages of the TWS headphone charging case 200, the concave external surface 202 of the TWS headphone charging case 200 may provide a superior ergonomic form factor as compared to a TWS headphone charging case that has a flat bottom. For example, the TWS headphone charging case 200 may be more pleasing to look at than a flat-bottomed TWS headphone charging case to some users. As another example, the curvature of the external surface 202 of the TWS headphone charging case 200 may be more comfortable against a hand of a user when the user handles the TWS headphone charging case 200 than a flat surface.

Figure 3:
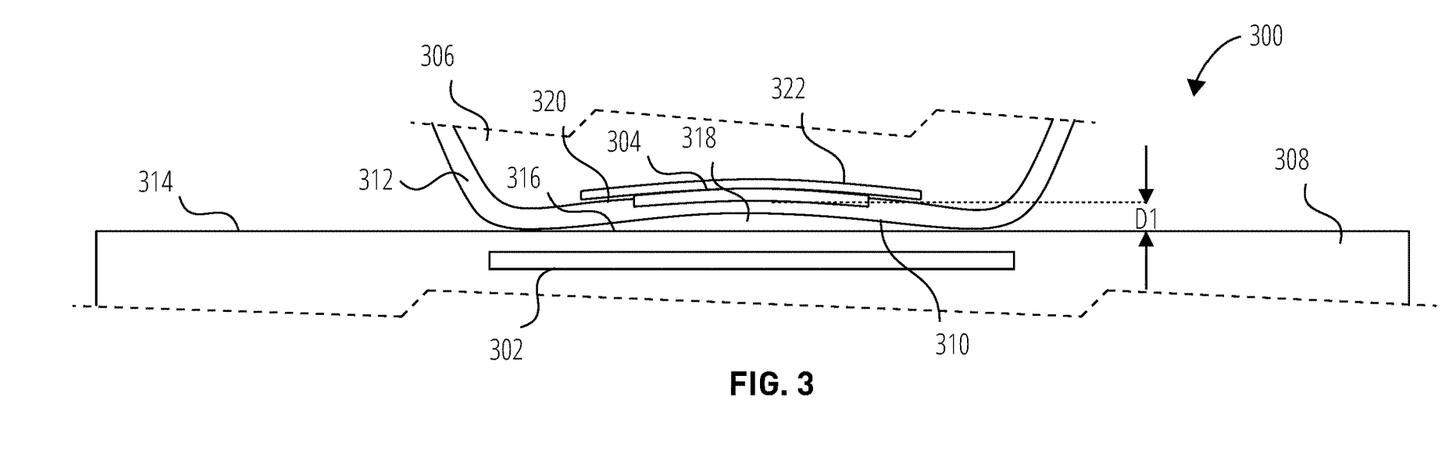
FIG. 3 is a cross-sectional view of a portion of a wireless power system, which is another example of the wireless power system of FIG. 1.

FIG. 3 is a cross-sectional view of a portion of a wireless power system 300, which is an example of the wireless power system 100 of FIG. 1. The wireless power system 300 includes a TWS headphone charging case 306 in physical engagement with a wireless power transmitter 308. The TWS headphone charging case 306 includes a housing 312 and a receive power coil 304 supported on an internal surface 320 of a portion of the housing 312 that is between the receive power coil 304 and the wireless power transmitter 308. From a perspective of an interior of the housing 312 the internal surface 320 and the receive power coil 304 are convex. An external surface 310 of the housing 312 engages with the wireless power transmitter 308. The TWS headphone charging case 306 may also include an electromagnetic (EM) shield 322 on the receive power coil 304 to shield electronics (e.g., a battery 104 and power circuitry 106 of FIG. 1) from the receive power coil. The EM shield 322 may be substantially conformal to the internal surface 320 and/or the receive power coil 304. In some embodiments the EM shield 322 may be substantially as thick as the receive power coil 304. In some embodiments the EM shield 322 may be thicker than the receive power coil 304.

The wireless power transmitter 308 includes a charging pad 314 including a transmit power coil 302. The transmit power coil 302 is configured to provide wireless power to the receive power coil 304 via inductive coupling when the TWS headphone charging case 306 is placed on the charging pad 314. A surface 316 of the charging pad 314 is flat. Since a geometry of the external surface 310 of the housing 312 that engages the flat surface 316 of the charging pad 314 is irregular (i.e., concave), the external surface 310 and the surface 316 at least partially define a gap 318 therebetween.

The concave shape of the external surface 310 provides the thermal and ergonomic benefits discussed above for the TWS headphone charging case 200 of FIG. 2. The curved shape of the housing 312, however, may result in a distance D1 between the receive power coil 304 and the surface 316, which may be greater than a distance between a receive power coil and the surface 316 for a flat-bottomed TWS headphone charging case. By way of non-limiting example, the distance D1 may be substantially between 1.0 millimeters (mm) and 6.0 mm. Also by way of non-limiting example, the distance D1 may be substantially between 2.0 mm and 2.6 mm. As a specific, non-limiting example, the distance D1 may be substantially 2.30 millimeters (mm) in contrast to an expected 1.60 mm for a comparable flat-bottomed TWS headphone charging case. Of course, the distance D1 may be influenced by the thickness of the housing 312.

In one such example a charging efficiency involving the TWS headphone charging case 306 was determined to be substantially 62%, in contrast to a 63% charging efficiency determined for a flat-bottomed TWS headphone charging case having a flat receive power coil. Accordingly, the greater distance between the receive power coil 304, as compared to a flat-bottomed TWS headphone charging case, along with the curvature of the receive power coil 304 of the TWS headphone charging case 306, does not appear to have a significant impact on the charging efficiency. It is expected that the slightly less charging efficiency (62%) as compared to that of the flat-bottomed TWS headphone charging case (63%) is due to the greater distance D1 rather than due to the curvature of the receive power coil 304. The curvature of the receive power coil 304 does not appear to impact the quality of alignment between the receive power coil 304 and the transmit power coil 302.

Figure 4:
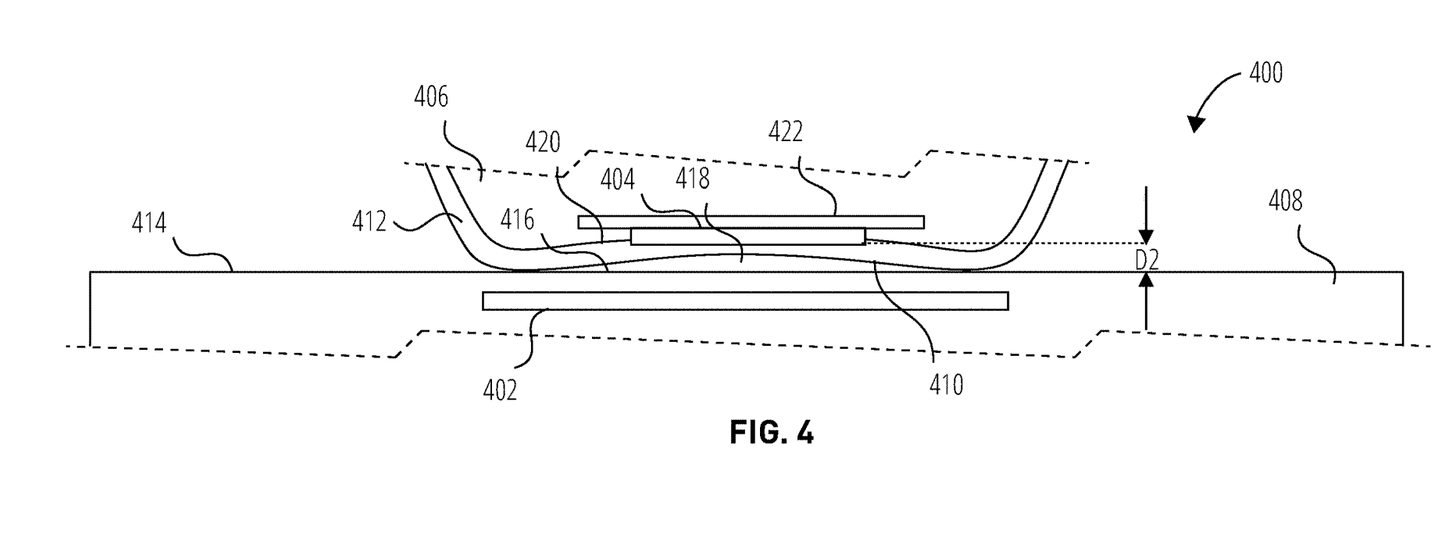
FIG. 4 is a cross-sectional view of a portion of a wireless power system, which is another example of the wireless power system of FIG. 1.

FIG. 4 is a cross-sectional view of a portion of a wireless power system 400, which is another example of the wireless power system 100 of FIG. 1. The wireless power system 400 is similar to the wireless power system 300 discussed with reference to FIG. 3. For example, the wireless power system 400 includes a wireless power transmitter 408 including a charging pad 414, a surface 416 on the charging pad 414, and a transmit power coil 402 in the charging pad 414, which are similar to the charging pad 314, the surface 316, and the transmit power coil 302, respectively, discussed above for the wireless power transmitter 408 of FIG. 3.

The wireless power system 400 also includes a TWS headphone charging case 406 similar to the TWS headphone charging case 306 discussed above with reference to FIG. 3. For example, the TWS headphone charging case 406 includes a housing 412 similar to the housing 312 of FIG. 3. Like the housing 312 of FIG. 3, which includes a concave-shaped external surface 310, the housing 412 also includes an external surface 410 that is concave-shaped, defining a gap 418 similar to the gap 318 of FIG. 3. In contrast to the housing 312 of FIG. 3, however, a portion of an internal surface 420 of the housing 412 upon which a receive power coil 404 is supported may be flat rather than convex to support a flat receive power coil 404 rather than the convex receive power coil 304 of FIG. 3. The TWS headphone charging case 406 may also include a flat EM shield 422 on the flat receive power coil 404 to shield electronics from the receive power coil 404. In some embodiments the EM shield 422 may be substantially as thick as the receive power coil 404. In some embodiments the EM shield 422 may be thicker than the receive power coil 404.

A distance D2 from the receive power coil 404 to the surface 416 of the charging pad 414 may be similar to the distance D1 for the wireless power system 300 of FIG. 3. By way of non-limiting example, the distance D2 may be substantially between 1.0 mm and 6.0 mm. Also by way of non-limiting example, the distance D2 may be substantially between 2.0 mm and 2.6 mm. For example the distance D2 may be substantially 2.30 mm. A charging efficiency of an example of the wireless power system 400 of FIG. 4 was determined to be substantially 61%, which is slightly less than the 63% charging efficiency of a flat-bottomed TWS headphone charging case and the 62% charging efficiency of the above-discussed example of the wireless power system 300 of FIG. 3.

Figure 5:
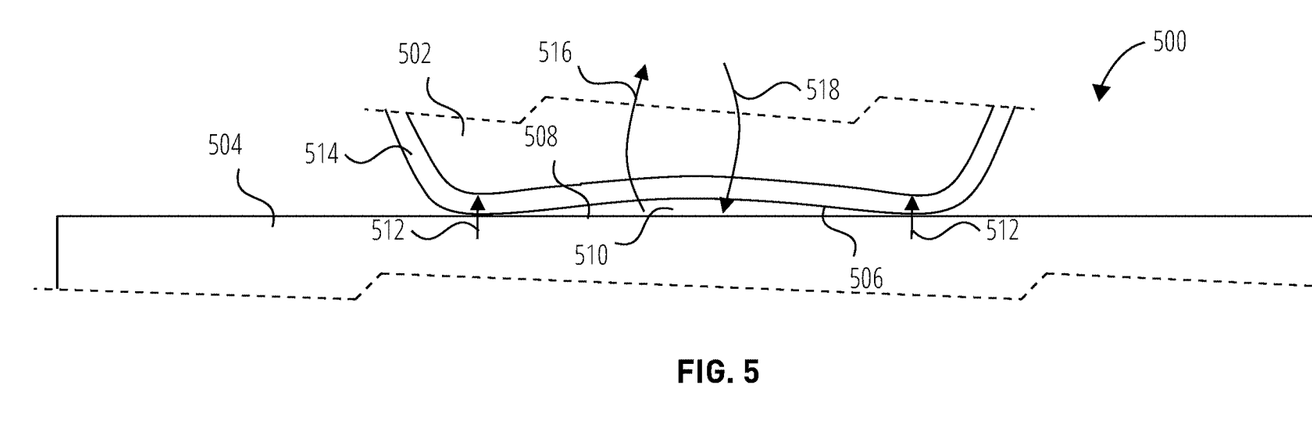
FIG. 5 is a cross-sectional view of a wireless power system, which is yet another example of the wireless power system of FIG. 1.

FIG. 5 is a cross-sectional view of a wireless power system 500, which is yet another example of the wireless power system 100 of FIG. 1. The wireless power system 500 includes a TWS headphone charging case 502 in physical engagement with a wireless power transmitter 504. More specifically, an external surface 506 of a housing 514 of the TWS headphone charging case 502 is in physical engagement with a surface 508 of the wireless power transmitter 504, defining a gap 510 therebetween.

FIG. 5 illustrates some thermal dissipation characteristics of the wireless power system 500, which may be applicable to the wireless power system 100 of FIG. 1, the TWS headphone charging case 200 of FIG. 2, the wireless power system 300 of FIG. 3, and the wireless power system 400 of FIG. 4. In operation, the wireless power transmitter 504 may drive current through a transmit power coil (not shown, but similar to the transmit power coil 128 of FIG. 1, the transmit power coil 302 of FIG. 3, and the transmit power coil 402 of FIG. 4). Passage of current through the transmit power coil may generate heat.

Some of the heat may dissipate from the wireless power transmitter 504 through heat conduction 512 to the TWS headphone charging case 502 at portions of the external surface 506 that physically engage with the surface 508 of the wireless power transmitter 504. Some of the heat may also dissipate through convection as air in the gap 510 is heated by the wireless power transmitter 504, causing the air to rise from the gap 510 as heated air 516. Cool air 518 may take the place of the removed heated air 516 in the gap 510, be heated by the wireless power transmitter 504, and rise as heated air 516. The convection cycle may continue, which may dissipate heat from the wireless power transmitter 504 that might otherwise have dissipated to the TWS headphone charging case 502.

The heat dissipation characteristics of the wireless power system 500 may be superior to that of a wireless power system including a flat-bottomed TWS headphone charging case. For example, the flat bottom would be conformal to the flat surface 508, which would increase the contacting surface area between the flat-bottomed TWS headphone charging case and the surface 508 as compared to that of the TWS headphone charging case 502. As a result, more heat conduction from the wireless power transmitter 504 to a flat-bottomed TWS headphone charging case would be expected than for the TWS headphone charging case 502. Also, a flat-bottomed TWS headphone charging case would not leave a gap between itself and the wireless power transmitter 504, eliminating the possibility of heat dissipation through convection.

Figure 6:
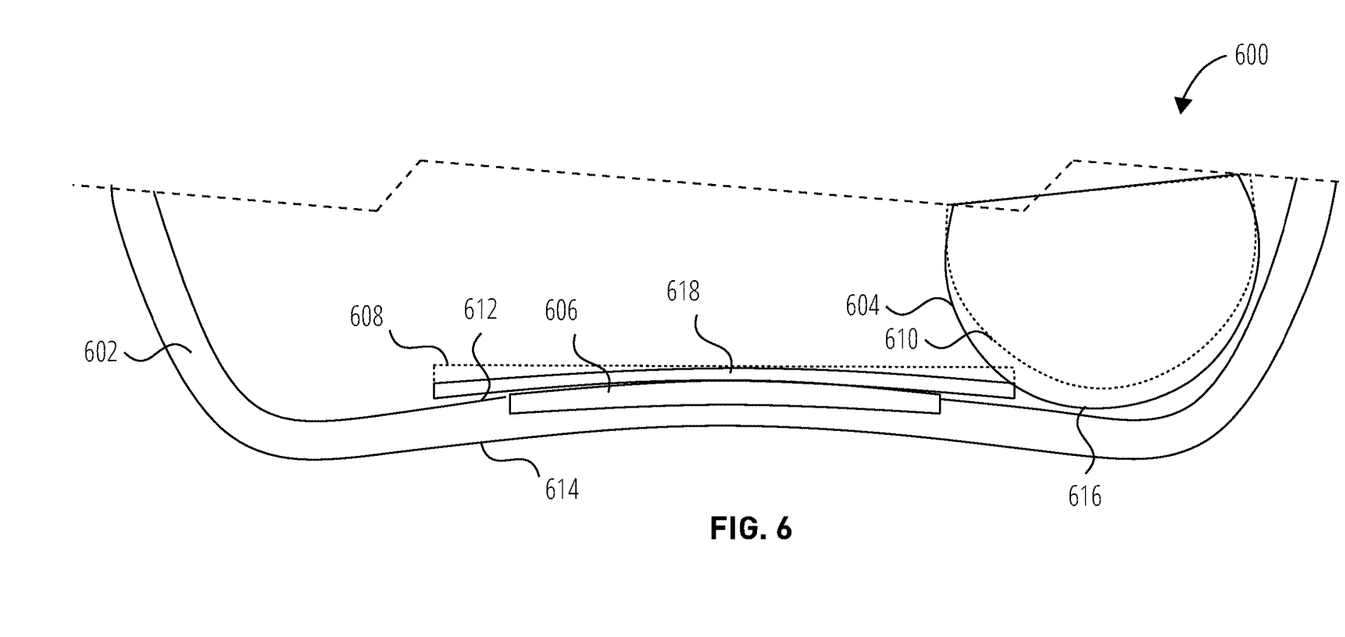
FIG. 6 is a cross-sectional view of a TWS headphone charging case, according to some embodiments.

FIG. 6 is a cross-sectional view of a TWS headphone charging case 600, according to some embodiments. The TWS headphone charging case 600 includes a housing 602 having an internal surface 612 and an external surface 614. The external surface 614 is concave from a perspective of outside of the housing 602 and the internal surface 612 is convex from a perspective of inside of the housing 602. The TWS headphone charging case 600 also includes a curved receive power coil 606 supported on the internal surface 612 of the housing 602. The TWS headphone charging case 600 further includes a curved EM shield 618 on the curved receive power coil 606. The curved receive power coil 606 and the curved EM shield 618 are convex from a perspective of inside of the housing 602.

The TWS headphone charging case 600 further includes a battery 604 inside of the housing 602. The curved geometry of the curved EM shield 618 accommodates for a bottom 616 of the battery 604 to extend downward past the curved EM shield 618 toward the internal surface 612 of the housing 602. By contrast, in the case of a flat EM shield 608 (shown using dotted lines), a battery 610 (also shown using dotted lines) would be positioned higher within the housing 602 than the battery 604 with the curved EM shield 618 because the flat EM shield 608 would not accommodate placement of the battery 610 as low as the battery 604, as illustrated in FIG. 6. As a result, the use of a curved receive power coil 606 on a curved internal surface 612 (e.g., similar to the TWS headphone charging case 306 of FIG. 3) and a curved EM shield 618 may enable a smaller form factor for and/or provide more usable space (e.g., maximizing usable internal volume) within the TWS headphone charging case 600 than a TWS headphone charging case with a flat EM shield 608 (e.g., similar to the TWS headphone charging case 406 of FIG. 4). This is at least partially because the battery 604 with the curved receive power coil 606 and EM shield may be placed lower within the housing 602 than the battery 610 with the flat receive power coil and the flat EM shield 608.

Another advantage of the curved receive power coil 606 in a curved-bottom housing such as the housing 602 over a flat receive power coil 608 in a curved-bottom housing is that a curved internal surface 612 supporting the curved receive power coil 606 may at least substantially match a curve of the external surface 614. As a result, a curved receive power coil 606 supported on a curved internal surface 612 may enable a more consistent wall thickness of the housing 602 as compared to that of a TWS headphone charging case having a curved external surface but a flat internal surface to support a flat receive power coil (e.g., similar to the TWS headphone charging case 406 of FIG. 4). In embodiments where the housing 602 is injection molded the more consistent wall thickness may improve cosmetics of the housing 602 for some users.

Figure 7:
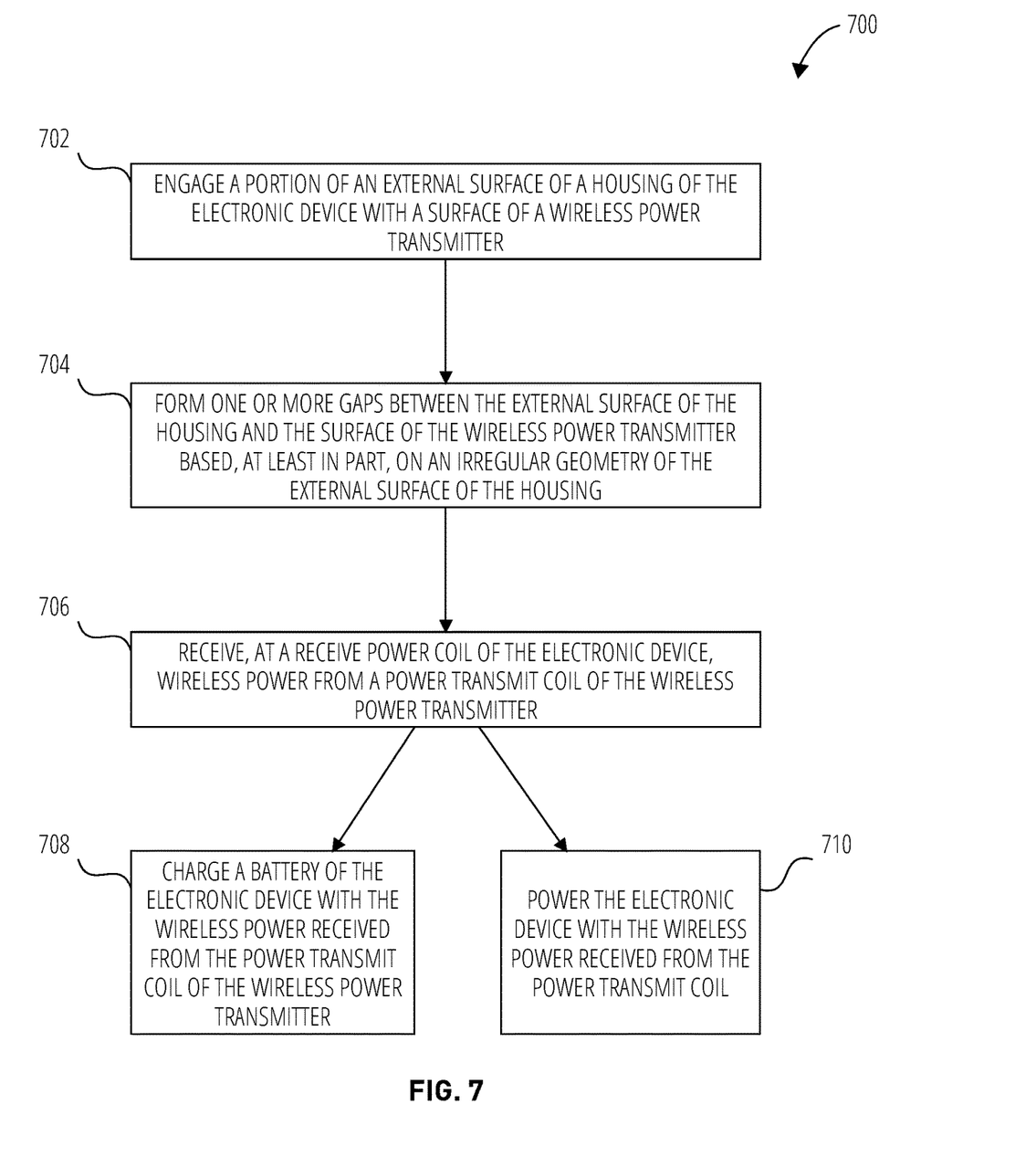
FIG. 7 is a flowchart illustrating a method of operating an electronic device, according to some embodiments.

FIG. 7 is a flowchart illustrating a method 700 of operating an electronic device, according to some embodiments. At operation 702 the method 700 includes engaging a portion of an external surface of a housing of the electronic device with a surface of a wireless power transmitter.

At operation 704 the method 700 includes forming one or more gaps between the external surface of the housing and the surface of the wireless power transmitter based, at least in part, on an irregular geometry of the external surface of the housing. In some embodiments forming the one or more gaps between the external surface of the housing and the surface of the wireless power transmitter includes allowing air to flow through the one or more gaps while receiving the wireless power from the power transmit coil. In some embodiments forming the one or more gaps between the external surface of the housing and the surface of the wireless power transmitter includes forming a gap that is flat on a wireless power transmitter side corresponding to a flat geometry of the surface of the wireless power transmitter, and convex on an electronic device side corresponding to a concave geometry of the external surface of the housing.

At operation 706 the method 700 includes receiving, at a receive power coil of the electronic device, wireless power from a power transmit coil of the wireless power transmitter.

At operation 708 the method 700 includes charging a battery of the electronic device with the wireless power received from the power transmit coil of the wireless power transmitter. In some embodiments charging the battery of the electronic device includes charging a charging case battery of a TWS headphone charging case. In some embodiments charging the battery of the electronic device includes charging headphone batteries of TWS headphones stored in a TWS headphone charging case. At operation 710 the method 700 includes powering the electronic device with the wireless power received from the power transmit coil. In some embodiments the wireless power received at the receive power coil (operation 706) may be used to charge a battery (operation 708), power the electronic device (operation 710), or both.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A housing for an electronic device, the housing comprising:
 an internal surface configured to face a receive power coil; and
 an external surface configured to face a wireless power transmitter, the external surface and the internal surface on opposing sides of a housing wall, the external surface shaped to define one or more gaps between the external surface and a surface of the wireless power transmitter responsive to placement of the external surface into engagement with the surface of the wireless power transmitter, and the external surface comprising a different shape than a shape of the surface of the wireless power transmitter.

2. The housing of claim 1, wherein the external surface comprises an irregular geometry and the surface of the wireless power transmitter is planar.

3. The housing of claim 1, wherein the internal surface is planar to support a planar receive power coil.

4. The housing of claim 1, wherein the internal surface is convex to support a convex receive power coil.

5. The housing of claim 1, wherein the one or more gaps are shaped to enable air to pass between the external surface of the housing and the surface of the wireless power transmitter responsive to placement of the external surface into engagement with the surface of the wireless power transmitter.

6. The housing of claim 1, wherein the housing is a housing for a truly wireless stereo (TWS) headphone charging case.

7. An electronic device, comprising:
 a receive power coil configured to receive wireless power from a transmit power coil of a wireless power transmitter; and
 a barrier including an internal surface facing the receive power coil and an external surface configured to face the transmit power coil, the external surface defining one or more gaps between the external surface and a surface of the wireless power transmitter responsive to placement of the external surface in engagement with the surface of the wireless power transmitter, and the external surface comprising a different shape than a shape of the surface of the wireless power transmitter.

8. The electronic device of claim 7, further comprising a housing enclosing the receive power coil, wherein the barrier is a wall of the housing.

9. The electronic device of claim 8, further comprising:
a battery enclosed within the housing; and
power circuitry within the housing, the power circuitry configured to control charging of the battery using wireless power received from the wireless power transmitter by the receive power coil.

10. The electronic device of claim 9, wherein a portion of the battery extends past an electromagnetic shield on the receive power coil proximate to the internal surface.

11. The electronic device of claim 8, wherein the housing is a truly wireless stereo (TWS) headphone charging case housing.

12. The electronic device of claim 7, wherein the receive power coil is conformal to the internal surface of the barrier.

13. The electronic device of claim 12, wherein the internal surface of the barrier is convex.

14. A method of operating an electronic device, the method comprising:
engaging a portion of an external surface of a housing of the electronic device with a surface of a wireless power transmitter;
forming one or more gaps between the external surface of the housing and the surface of the wireless power transmitter based, at least in part, on an irregular geometry of the external surface of the housing that is different from a geometry of the surface of the wireless power transmitter; and
receiving, at a receive power coil of the electronic device, wireless power from a power transmit coil of the wireless power transmitter.

15. The method of claim 14, further comprising charging a battery of the electronic device with the wireless power received from the power transmit coil of the wireless power transmitter.

16. The method of claim 15, wherein charging the battery of the electronic device comprises charging a charging case battery of a truly wireless stereo (TWS) headphone charging case.

17. The method of claim 15, wherein charging the battery of the electronic device comprises charging headphone batteries of truly wireless stereo (TWS) headphones stored in a TWS headphone charging case.

18. The method of claim 14, further comprising powering the electronic device with the wireless power received from the power transmit coil.

19. The method of claim 14, wherein forming the one or more gaps between the external surface of the housing and the surface of the wireless power transmitter comprises allowing air to flow through the one or more gaps while receiving the wireless power from the power transmit coil.

20. The method of claim 14, wherein forming the one or more gaps between the external surface of the housing and the surface of the wireless power transmitter comprises forming a gap that is:
flat on a wireless power transmitter side corresponding to a flat geometry of the surface of the wireless power transmitter; and
convex on an electronic device side corresponding to a concave geometry of the external surface of the housing.

* * * * *